No. 613,264. Patented Nov. 1, 1898.
J. E. GODDARD.
THREAD CUTTING TOOL.
(Application filed Dec. 14, 1897.)
(No Model.)
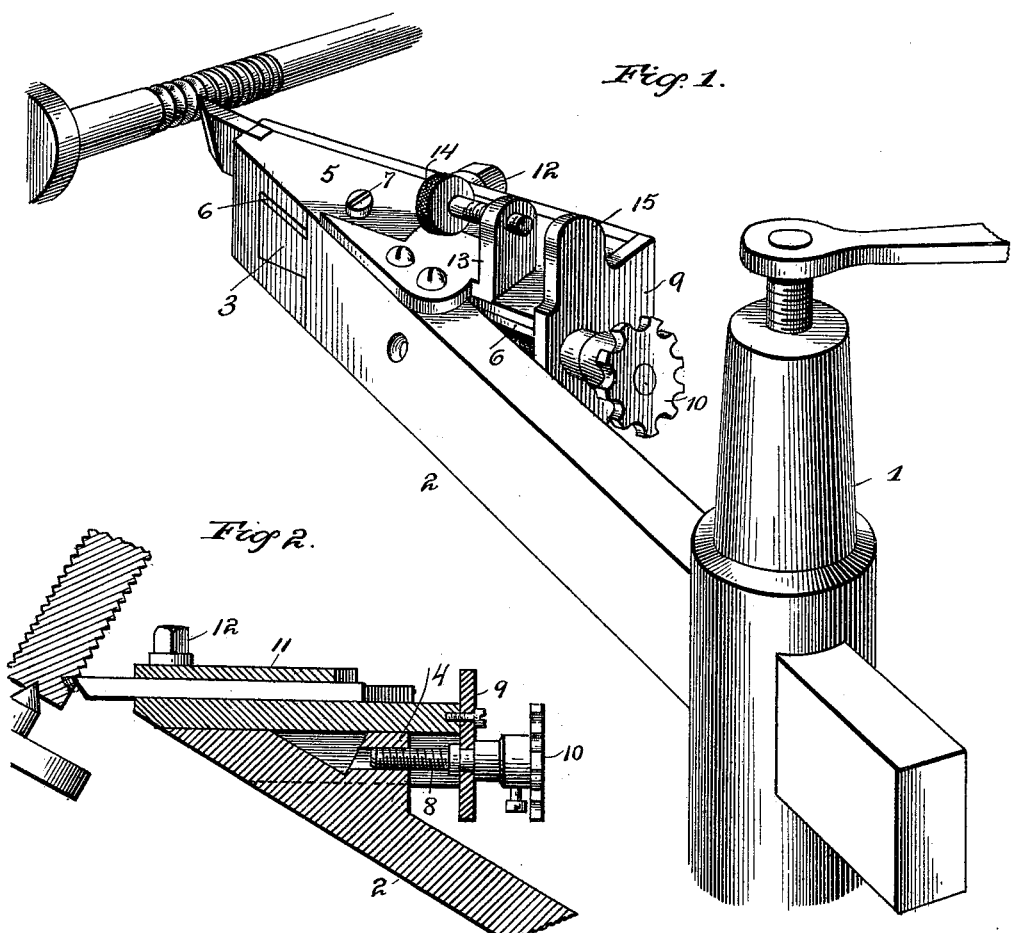
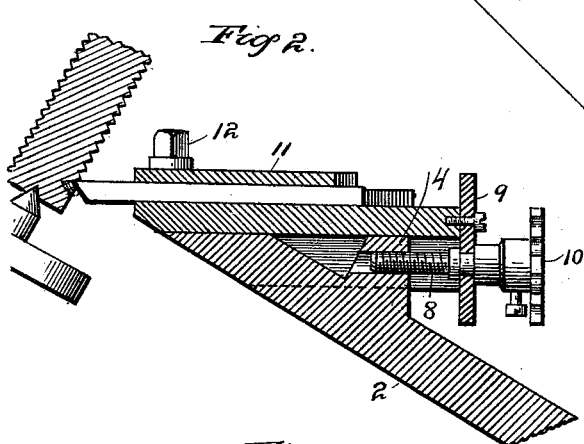
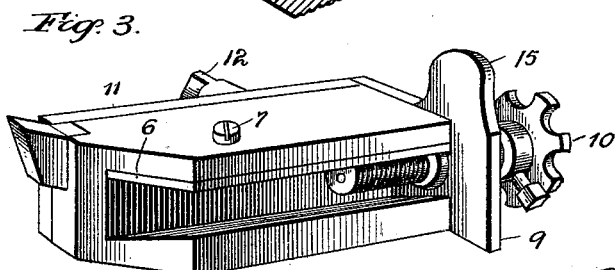
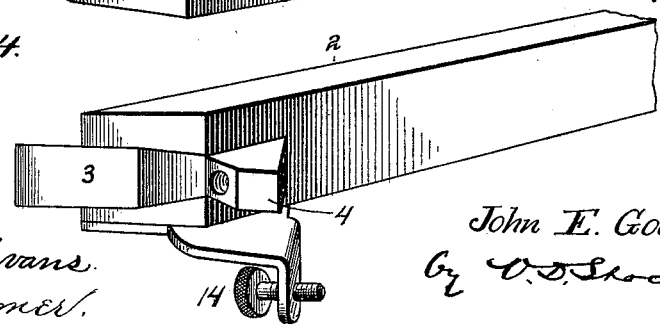
Witnesses
Victor J. Evans.
Harry L. Ames.
Inventor
John E. Goddard.
By O. D. Stockbridge
his Attorney.
THE NORRIS PETERS CO., PHOTO-LITHO., WASHINGTON, D. C.

UNITED STATES PATENT OFFICE.

JOHN E. GODDARD, OF SPENCER, MASSACHUSETTS.

THREAD-CUTTING TOOL.

SPECIFICATION forming part of Letters Patent No. 613,264, dated November 1, 1898.

Application filed December 14, 1897. Serial No. 661,827. (No model.)

*To all whom it may concern:*

Be it known that I, JOHN E. GODDARD, a citizen of the United States, residing at Spencer, in the county of Worcester and State of Massachusetts, have invented certain new and useful Improvements in Thread-Cutting Tools; and I do hereby declare the following to be a full, clear, and exact description of the invention, such as will enable others skilled in the art to which it appertains to make and use the same.

My invention relates to thread-cutting tools, the same being adapted for use in an ordinary lathe. According to the usual process of cutting screw-threads the angular cut is made by two edges of the cutter-bit, and in making the successive cuts to obtain the proper depth the cut is made from both sides of the notch or groove.

My invention contemplates cutting the stock from one side of the thread only, whereby the metal is cut away with less strain upon the machinery than by cutting from both sides, as has heretofore been the practice.

My invention consists in a thread-cutting tool, through the medium of which I am enabled to practice the process of cutting the stock from one side only in the act of cutting the thread. The tool consists, essentially, of the combination of a shank adapted for adjustment in the usual way in the tool-post of a lathe, a movable head or bit-holder connected with the shank at an angle, and means for imparting a reciprocating movement to the head, whereby the cutting-bit carried by the head may be applied to its work from time to time as the depth of the thread progresses.

In the drawings forming part of this specification, Figure 1 is a perspective showing the tool-post of a lathe with my improved tool connected therewith and its application to use in cutting a thread. Fig. 2 is a section through the shank and movable head and showing the cutting-bit in elevation. Fig. 3 is a perspective of the movable head removed from the shank, showing a dovetail groove in its side, a key-plate, and an adjusting-screw. Fig. 4 is a perspective of the shank, showing the side to which the movable head is attached and also a bracket connection.

1 is the tool-post of a lathe, within which is secured in the usual way the shank 2 of my improved tool. The outer end of this shank is chamfered or beveled, so as to form a surface or bearing at an angle with its sides, and is provided with a dovetail tongue 3 and with a projection 4. Operatively connected with the shank is a movable head-piece or bit-holder 5. This head-piece is provided with a dovetail groove upon one side and with a cutter socket or groove upon the other side. The movable head and the shank are coupled together by means of a dovetail tongue and groove, and the head is adapted to be adjusted backward and forward by means hereinafter explained. The groove in the head 5 is somewhat wider than the thickness of the tongue of the shank 2.

For convenience of assembling the parts and to compensate for wear and readily take up any slack that may for any reason occur between the parts I provide a key-plate 6 to fill the space between the dovetail tongue of the shank and the wall of the groove in the movable head and one or more set-screws 7. The parts are to be coupled, held, and guided firmly one upon the other, but so that the head may be freely moved forward and backward upon the shank. Means for operating the movable head consist of the screw 8, engaging the projection 4 on the shank, and the bracket or plate 9, connected with the movable head 5. The screw itself is conveniently operated through thumb-wheel 10. The cutting-bit is firmly held in its socket by means of clamping-plate 11 and set-screws 12. For means of gaging the forward movement of the head with relation to the shank I provide a bracket 13 and an adjustable screw 14, the latter to operate in conjunction with the projecting wing 15 from the plate 9. By adjusting the screw 14 the forward thrust of the movable head through the medium of screw 8 will be gaged or limited and can be set in advance to prevent feeding the tool too far forward and to indicate that the proper depth of thread has been formed.

In operation the shank of my improved tool is adjusted in the same way that an ordinary tool is adjusted in the tool-post, the movable head of the shank is arranged at the angle of the screw-thread, and thus as the different cuts are made the side of the cutting-bit will move forward in a right line at the proper angle and the cut will be taken or made by the beveled end of the cutting-bit. In other words, there will be only one cutting edge on my improved bit for cutting a thread, whereas according to the usual system both faces of the angular point of the tool are cutting edges. In cutting the thread with my improved tool the shank is clamped in the tool-post and the cutting-bit adjusted in contact with the surface of the stock to be threaded, the screw 7 being adjusted so as to firmly clamp the head of the shank and yet permit of free forward movement of the head, then setting up feeding-screw 8, and starting the lathe. The cutting-bit will enter the work and take off the first chip. Then withdraw the movable head and return the work to the starting-point, again set up the head to bring the cutter in engagement with the stock, and repeat. The cut in the stock will progress step by step, as graphically illustrated opposite the point of the cutting-bit in Fig. 2.

Having described my invention, what I claim as new, and desire to secure by Letters Patent, is—

1. A thread-cutting tool comprising a shank or stock arranged at right angles to the work, a head or tool-holder adjusted at an angle with the stock and with the work, a bit having a single cutting edge arranged longitudinally of the head and adapted to be fed to the work at an angle and means for operating the head-piece whereby the thread is mainly cut from one side only, substantially as described.

2. A thread-cutting tool involving the combination of a shank-piece having a chamfered or inclined face, a movable bit-holding head-piece connected with and adapted to reciprocate upon the beveled side of the shank-piece, a thread-cutting bit arranged to move longitudinally of its axis with the head-piece, a gage for regulating the forward thrust of the head, and means for operating the head-piece, substantially as described.

In testimony whereof I affix my signature in presence of two witnesses.

JOHN E. GODDARD.

Witnesses:
L. J. GRINNELL,
H. S. TRIPP.